(12) United States Patent
Katz et al.

(10) Patent No.: US 8,498,299 B2
(45) Date of Patent: Jul. 30, 2013

(54) FLOODING-BASED ROUTING PROTOCOL HAVING AVERAGE-RATE AND BURST-RATE CONTROL

(75) Inventors: David M. Katz, Santa Cruz, CA (US); David Ward, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 139 days.

(21) Appl. No.: 12/954,099

(22) Filed: Nov. 24, 2010

(65) Prior Publication Data

US 2012/0044940 A1 Feb. 23, 2012

Related U.S. Application Data

(60) Provisional application No. 61/375,166, filed on Aug. 19, 2010.

(51) Int. Cl.
*H04L 12/56* (2006.01)
(52) U.S. Cl.
USPC ........................................................ 370/400
(58) Field of Classification Search
USPC ........................................ 370/400, 254, 255
See application file for complete search history.

(56) References Cited

U.S. PATENT DOCUMENTS

| 7,184,437 | B1 | 2/2007 | Cole et al. |
| 7,739,403 | B1 | 6/2010 | Balakrishna et al. |
| 7,804,769 | B1 | 9/2010 | Tuplur et al. |
| 2008/0044181 | A1 | 2/2008 | Sindhu |
| 2008/0240118 | A1* | 10/2008 | Roy et al. ...................... 370/400 |

OTHER PUBLICATIONS

Dai et al., "Performance Analysis of Broadcast Protocols in Ad Hoc Networks Based on Self-Pruning", IEEE Transactions on Parallel and Distributed Systems, vol. 15, No. 11, Nov. 2004, pp. 1027-1040.
Balay et al., "IS-IS Mesh Groups", Network Working Group, RFC 2973, The Internet Society, Oct. 2000, 9 pgs.
Choudhury, "Prioritized Treatment of Specific OSPF Version 2 Packets and Congestion Avoidance", Network Working Group RFC 4222, Oct. 2005, 4 pgs.
Schoenen, Rainer and Achim Dahlhoff, "Closed Loop Credit-Based Flow Control with Internal Backpressure in Input and Output Queued Switches", Proceedings of the IEEE Conference on High Performance Switching and Routing, 2000, pp. 195-203.

(Continued)

*Primary Examiner* — Dang Ton
*Assistant Examiner* — Kevin Lee
(74) *Attorney, Agent, or Firm* — Shumaker & Sieffert, P.A.

(57) ABSTRACT

An enhanced, flooding-based routing protocol is described that provides burst-rate and average-rate flow control. A routing device comprises a network interfaces configured to send and receive packets over a layer-two (L2) communication medium. A flooding-based link state routing protocol executes on a processor of the routing device to maintain network topology information for a network and establish an adjacency with a peer router over the layer-two (L2) communication medium. A database of the routing device stores a minimum packet interval and a credit specified by the peer router for the adjacency. When sufficient credit has been allocated to the L2 communication medium, a scheduler of the router dequeues link state messages from an outbound packet queue and floods each of the link state messages to the L2 communication medium while maintaining at least the specified minimum packet interval between each of the plurality of link state messages.

16 Claims, 5 Drawing Sheets

OTHER PUBLICATIONS

Ash et al. "Congestion Avoidance & Control for OSPF Networks", Network Working Group, <draft-ash-manral-ospf-congestion-control-00.txt, Apr. 2002, pp. 18.

Zinin et al. "Flooding Optimizations in Link-State Routing Protocols", Network Working Group, draft-ietf-ospf-isis-flood-opt-01.txt, Mar. 2001, 12 pgs.

Extended European Search Report issued Oct. 4, 2011 in corresponding EP Application No. 11177070.7, 8 pgs.

Zimmerman, "OSI Reference Model—The ISO Model of Architecture for Open Systems Interconnection," IEEE Transaction on Communications, vol. 28, No. 4, Apr. 1980, pp. 425-432.

Moy, "OSPF Version 2," Network Working Group, RFC 2328, Apr. 1998, 204 pp.

International Standard ISO/IEC10589, Informational technology-Telecommunications and information exchange between systems-Intermediate System to Intermediate System intra-domain routeing information exchange protocol for use in conjunction with the protocol for providing the connectionless-mode network service (ISO-8473), Second edition, Nov. 15, 2002, 210 pp.

"IS-IS Link-State Database," found at http://cisco.iphelp.ru/faq/5/ch10lev1sec3.html, retrieved on Jul. 26, 2010, 7 pp.

"IS-IS Database Synchronization," found at http://fengnet.com/book/OSPFandISIS/ch06lev1sec2.html, retrieved on Jul. 16, 2010, 13 pp.

U.S. Appl. No. 12/954,128, by David Ward, filed Nov. 24, 2010.

EP Communication Pursuant to Article 94(3) EPC dated Oct. 3, 2012 in corresponding EP Application No. 11177070.7, 5 pgs.

"Private Network-Network Interface" Specification Version 1.0 (PNNI 1.0), The ATM Forum—Technical Committee, af-pnni-0055.000, Mar. 1996, 385 pgs.

Response filed Jan. 29, 2013 to EP Communication dated Oct. 4, 2012 in corresponding EP Application 11177070.7, 3 pgs.

\* cited by examiner

FLOODING-BASED ROUTING PROTOCOL HAVING AVERAGE-RATE AND BURST-RATE CONTROL This application claims the benefit of U.S. Provisional Application No. 61/375,166, filed Aug. 19, 2010, which is hereby incorporated by reference in its entirety.

TECHNICAL FIELD

The invention relates to computer networks and, more particularly, to routing protocols used within computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form.

Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols use flooding-based distribution mechanisms to announce topology information to routers within the network. These routing protocols typically rely on routing algorithms that require each of the routers to have synchronized routing topology information. For example, Open Shortest Path First (OSPF) and Intermediate system to intermediate system (IS-IS) routing protocols are link state protocols that use link state messages to ensure their routing topology is synchronized with respect to available interfaces, metrics and other variables associated with network links. For example, OSPF utilizes Link State Advertisements (LSAs) while IS-IS uses Link State protocol data units (LSPs) to exchange information. A router generating a link state message typically floods the link state message throughout the network such that every other router receives the link state message. In network topologies where routers are connected by point-to-point connections, each router floods link state messages to adjacent routers reachable on each interface to ensure synchronization. In networks using multi-access media, such as an Ethernet network, the routers within the network flood the link state messages to all other routers. In either case, the receiving routers construct and maintain their own network topologies using the link information received via the link state messages. IS-IS is specified in "Intermediate system to Intermediate system routing information exchange protocol for use in conjunction with the Protocol for providing the Connectionless-mode Network Service (ISO 8473)", ISO, ISO/IEC 10589:2002, the entire contents of which is incorporated herein by reference.

Recently, flooding-based routing protocols have been extended to carry significant information between routers that is ancillary to routing control. For example, in addition to carrying topology information, routing protocols have been extended to carry implementation-specific information, such as configuration data, hardware inventory, additional capability information and other information.

SUMMARY

In general, an enhanced, flooding-based routing protocol is described that provides burst-rate and average-rate flow control. The techniques may allow conventional flooding-based routing protocols to be used to synchronize vast amounts of data between routers, yet provide mechanisms by which allow individual receiving routers can control the rate at which each sender floods the information.

In particular, techniques are described by which receiving routers control both the average rate and the burst rate of flood-based transmission by sending routers. Moreover, control may be achieved in a fail-safe manner that does not overrun receivers. That is, in some circumstances, sending routers may reduce or even halt flooding-based transmissions in the event no affirmative permission is received by a receiving router. By implementing such a mechanism, the distribution mechanism for the flooding-based routing protocol within a network can be implemented as a "pull" model in which the rate at which state information is consumed by individual receiving routers ultimately controls the flow of the state information through the network.

In one example, the flooding-based routing protocols described herein are extended to incorporate an average rate control that allows a receiving router to continuously control the average rate at which a sending router floods information to an adjacency. In particular, the routing protocol used for communication between the routers carries extended parameters by which the receiving router specifies a transmission credit. In one embodiment, the credit specifies a number of additional packets the sender is permitted to send to the receiver. Alternatively, the credit specifies a number of bytes the sender is permitted to send. Upon sending the specified number of packets or bytes, the sender pauses transmission until additional credit is received. The rate at which credits are advanced by the receiving router determines the average rate at which the sending router transmits the data and allows the receiving router to control the average rate at which the receiving router is required to handle incoming data. The amount of credit advanced at a time and the algorithm by which the receiving routers advance the credits determine the dynamics of the data flow within the network, including the maximum burst size and the average packet throughput, which in turn determines the amount of buffering required at the receiving routers. The receiving routers periodically transmit their credits as reliability mechanisms to avoid deadlock situations where communication failure prevents the sending router from receiving the credit.

In a second example, the flooding-based routing protocols described herein are extended to allow receiving routers to specify a policier in the form of a minimum inter-packet transmission interval to be applied by the sending router. That is, the receiving router determines and specifies a minimum transmission interval which the sending router must delay between each packet transmission. This provides burst rate control in addition to the average rate control provided by the credit-based scheme, and is applicable to multi-access media such as Ethernet as well as point-to-point links topologies. By implementing such a mechanism, the link state messages for the flooding-based routing protocol within the network system can be implemented as a "pull" model in which the rate at which topology information is consumed by individual receiving routers ultimately controls the flow of data through the network system.

The mechanism described here can be deployed in a backward-compatible fashion with extensible flooding-based routing protocols, such as IS-IS.

In one embodiment, a method of controlling transmission of link state messages of a flooding-based link-state routing protocol comprising establishing a link-state routing adjacency between a first router and a second router over a layer-two (L2) communication medium. The method further comprises receiving, with the first routing device, an inbound message in accordance with the flooding-based link state routing protocol. The inbound message specifies a minimum packet interval for the routing adjacency between the first router and the second router. The method further comprises flooding a plurality of link state messages from the first router to the second router over the L2 communication medium to communicate the link state messages. The first router maintains at least the specified minimum packet interval between each of the plurality of link state messages when flooding the messages to the second router.

In another embodiment, a routing device comprises a network interfaces configured to send and receive packets over a layer-two (L2) communication medium. The routing device further comprises a control unit coupled to the network interface. A flooding-based link state routing protocol executes on a processor of the control unit to maintain network topology information for a network and establish an adjacency with a peer router over the layer-two (L2) communication medium. A database of the routing device stores a minimum packet interval specified by the peer router for the adjacency, and an outbound packet queue stores a plurality of link state messages generated by the link state routing protocol to be flooded to the peer router over the L2 communication medium. The routing device further comprises a scheduler that dequeues the link state messages from the outbound packet queue and floods each of the link state messages to the L2 communication medium, wherein the scheduler maintains at least the specified minimum packet interval between each of the plurality of link state messages when flooding the plurality of link state messages to the L2 communication medium.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
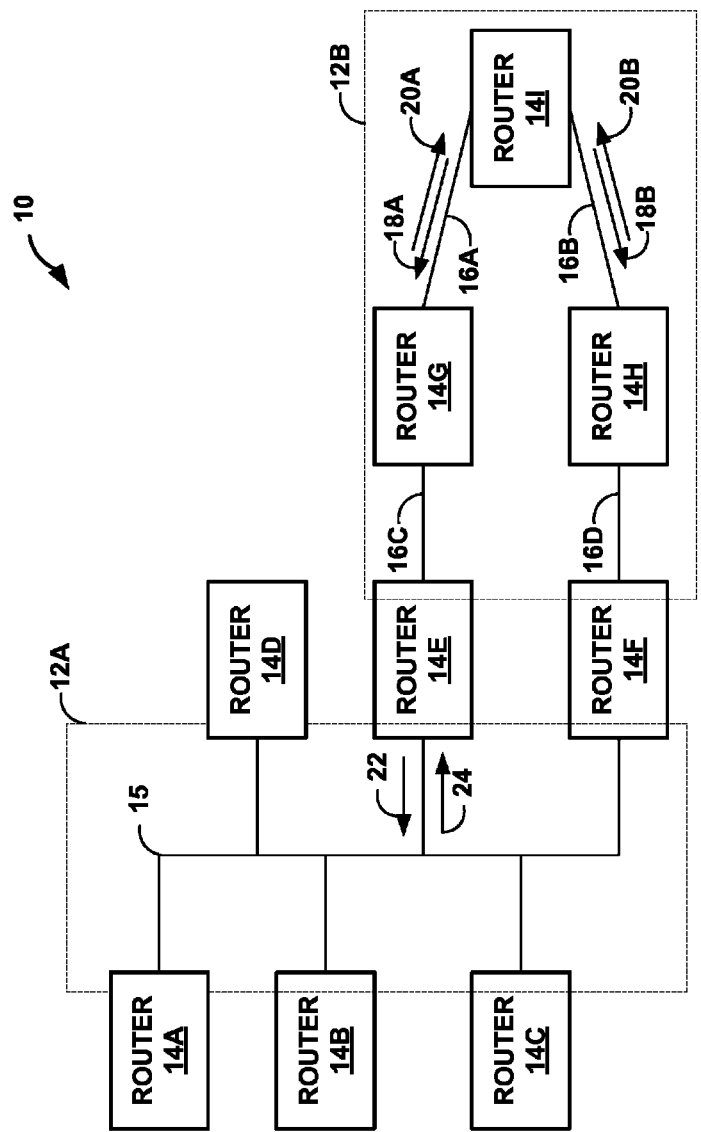
FIG. 1 is a block diagram illustrating an exemplary network system that supports an enhanced link state protocol consistent with the principles of the invention.

FIG. 1 is a block diagram illustrating an exemplary network system 10 that supports an enhanced link state protocol consistent with the principles of the invention. For ease of illustration, the example network system 10 is shown to include two networks 12A, 12B that use different forms of underlying layer two (L2) communications media. For example, network 12A uses "multi-access media" 15 in which all L2 communications for the network are sent to (i.e., broadcasted to) all routers 14A-14F coupled to the network. One example of a broadcast network is an Ethernet network, for example, in which an Ethernet frame is communicated to all nodes of the network. In contrast, network 12B uses point-to-point L2 communication media, such as optical links 16A-16D. In this case, routing protocol update messages are sent between adjacent routers and are processed and terminated by those routers. In this example, routers 14E, 14F are physically present in both networks 12A and 12B utilizing different physical interfaces provided by the routers. Although not shown in FIG. 1, network system 10 may include other network devices, such as switches and hubs. Further, although not shown in FIG. 1, each of routers 14 typically services a variety of end-user computing devices, such as laptop computers, desktop computers, workstations, personal digital assistants (PDAs), and cellular phones.

Network system 10 is shown with respect to networks 12A, 12B that utilize L2 multi-access media 15 and L2 point-to-point media 16 for ease of illustrating the techniques described herein. Reference to layers herein, such as L2 and L3, refer to the appropriate layer in the Open Systems Interconnection (OSI) model. In particular, L2 refers to the data link layer within the OSI model. The data link layer may provide the functional and procedural methods to transfer data between the network devices and to detect and possibly correct errors that may occur in the physical layer. An example of a L2 communication medium is an Ethernet network. L3 refers to the network layer within the OSI model. The network layer may provide the functional and procedural methods for transferring variable length data sequences from a source to a destination via one or more networks while maintaining the quality of service requested by higher layers. An example of a layer 3 protocol is the Internet Protocol (IP). More information concerning the OSI model can be found in a IEEE publication entitled "OSI Reference Model—the ISO Model of Architecture for Open Systems Interconnection," by Hubret Zimmermann, published in IEEE Transactions on Communications, vol. 28, no. 4, dated April 1980, which is hereby incorporated by reference as if fully set forth herein.

Generally, routers 14 use flooding-based routing protocols to announce topology information to each other and synchronize link-state databases maintained by each of the routers. As described herein, routers 14 support an enhanced link state protocol (LSP) that has been extended in the manner described herein by which receiving routers that consume topology information are able to control both the average and the burst rate of flood-based transmissions by the sending routers. In one example, a new, opaque Type, Length, Value (TLV) is defined that can be carried by various types of link state messages that are already used within network system 10. The TLV may include a first field for carrying a transmission credit that allows a router to control the average rate at which another router floods information to an adjacency. In addition, the TLV may include a second field for carrying a minimum time interval, e.g., in microseconds, which the sending router must delay between each successive packet transmission. This allows the receiving router to control a policer within the sending router, and thus the packet burst rate, with very low reverse bandwidth consumption. By implementing such a mechanism, the link state messages for the flooding-based routing protocol within network system 10 can be implemented as a "pull" model in which the rate at which topology information is consumed by individual receiving routers 14 ultimately controls the flow of data through the network system.

The TLV may be carried by a variety of different types of link state messages used within network system 10. For example, routers 14 typically exchange initial link state messages to establish the adjacency relationship. For example, routers 14 may exchange IS-IS HELLO protocol data units (PDUs) to establish adjacencies with other routers. Routers 14 may include the TLV described herein within these initial PDUs so as to inform the other routers as to their data consumption rate requirements. In addition, or alternatively, routers 14 opaquely include the TLV within the flooding-based link state messages to synchronize link-state databases maintained by each of the routers. Each link state message is typically refreshed periodically on the network and is acknowledged by the receiving routers. For example, routers 14 may utilize periodic IS-IS link state PDUs for synchronizing their link-state databases and utilize partial sequence number PDUs (PSNPs) and complete sequence number PDUs (CSNPs) to acknowledge receipt of the information. Routers 14 may embed the TLV within the link state PDUs, or, more likely, within the acknowledgement PDUs.

In one embodiment sending routers apply the average- and burst-rate control mechanisms only to "data-carrying" L3 signaling communications that carrying routing topology information of other information for which the routing protocol has been extended to convey. That is, in this embodiment, the sending routers do not apply the control mechanisms to other control messages of the routing protocol that are used to establish and maintain neighbor relationships or to acknowledge the receipt of data and verify database synchronization.

As one example, router 14I within network 12B typically establishes separate adjacencies with routers 14G and 14H as peer routers. Router 14I periodically floods link state messages 18A, 18B on links 16A, 16B to ensure that routers 14G-14I maintain synchronized link-state databases. Upon receiving the link state messages from router 14I, routers 14G, 14H respond with acknowledgement link state messages 20A, 20B, such as IS-IS PSNPs. This interaction continues so that routers 14I-14H maintain synchronized link-state databases. Throughout this process, router 14I operates in a first mode in which the router controls the transmission of link state messages 18A on link 16A in accordance with the current transmission credit and minimum time interval most recently specified by router 14G. Similarly, router 14I controls the transmission of link state messages 18B on link 16B in accordance with the current transmission credit and minimum time interval most recently specified by router 14H. Router 14I may have received the adjacently-specific flow-control mechanisms within opaque TLVs carried by adjacency establishment messages (e.g., IS-IS HELLO messages) or subsequently acknowledgement link state messages 20 (e.g., IS-IS PSNPs) associated with the point-to-point adjacencies between the routers.

When distributing routing topology information within broadcast network 12A, routers 14A-14F floods multicast link state messages through multi-access media 15, e.g., switched Ethernet media. Continuing the above example, in response to receiving link state messages from router 14G, router 14E may output one or more multicast link state messages 22 on multi-access media 15 to flood routing topology information to the multi-access media and receive acknowledgements 24 from each of routers 14A-14D. In one example, router 14I periodically outputs link state messages 22 to multi-access media 15 as IS-IS link state PDUs and receives acknowledgements 24 in the form of IS-IS CSNPs from each of routers 14A-14D acknowledging receipt of the information. During this process, router 14E operates in a second mode in which the router controls the transmission of multicast link state messages 22 on multi-access media 15 in accordance with the longest minimum time interval within TLVs carried by acknowledgements 24 without regard to any current transmission credit specified within the TLVs. That is, any packet credit that may have been specified within a TLV of an acknowledgement link state messages 20 (e.g., IS-IS PSNPs) received from broadcast network 12A is ignored by router 12E when transmitting link state messages onto multi-access media 15 of the network. In similar manner, each of routers 14A-14F participating in broadcast network 12A transmits data-carrying link state messages in accordance with the current longest minimum packet interval specified by any of the routers. This naturally throttles the packet rate between all neighbors of network 12A to the slowest rate currently required by any of the routers. In this example, the syntax for multicast mode is that same as point-to-point mode described above with respect to network 12B.

In some cases, router 12E may be configured to establish point-to-point routing protocol adjacencies with one or more routers 14A-14D, 14F of broadcast network 12 even though communicating over multi-access media 15. In this case, router 12E operates in point-to-point mode as described above for each of the adjacencies and, therefore, controls the packet rate based on both the minimum packet interval for the adjacency and the current allocated credit. Use of the policer and credit allocation with a mesh of point-to-point adjacencies allows for tight flow control even over multi-access media 15. However, some flooding-based protocols, such as IS-IS, utilize multicasting features over multi-access media without relying on periodic retransmission by all of the routers. In IS-IS, for example, a designated router periodically transmits a digest of the state (in the form of a CSNP) onto multi-access medium (e.g., LAN). When another router receives the digest, the router will typically either request missing packets (by sending a PSNP) or multicast the missing packets if the designated router is missing them. This means that on IS-IS enabled router on a LAN can safely discard incoming IS-IS communications without adding any load to the LAN, i.e., without causing any other system on the LAN trying to retransmit the discarded communications to it. In such systems, an administrator may avoid a full mesh of point-to-point adjacencies over the multi-access medium and utilization of multicast mode may provide a sufficient level of flow control and high data transfer rate.

Figure 2:
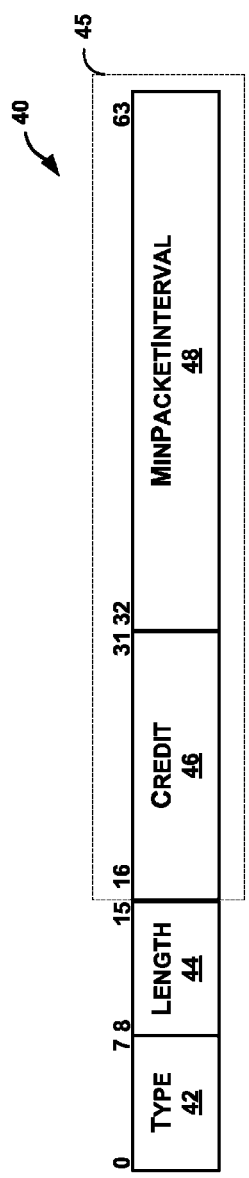
FIG. 2 is a block diagram illustrating a router that supports the enhanced LSP consistent with the principles of the invention.

FIG. 2 is a block diagram illustrating an example encoding of the average and burst rate control information described herein for the IS-IS routing protocol. In general, an IS-IS link state PDU is composed of a fixed header and a number of tuples, each consisting of a Type, a Length, and a Value (TLV). In the example of FIG. 2, TLV 40 includes a TYPE field 42, a LENGTH field 44, a VALUE FIELD 45 that is partitioned into a CREDIT sub-field 46 and a MINPACKETINTERVAL sub-field 48.

TYPE field 42 has a length of one octet that specifies a unique identifier for the new TLV defined herein for carrying the burst rate and average rate control information for the flooding-based routing protocol. LENGTH field 44 is one octet in length and indicates the length of the Value field 45 in octets, i.e., six in this example TLV.

CREDIT sub-field 46 specifies the number of data-carrying link state messages (e.g., IS-IS link state PDUs) that a data-sending router is permitted to transmit. In one embodiment, a value of zero indicates that the data-sending router must stop sending data-carrying link-state messages. A data-receiving router can change the credit at any time by including a new TLV 40 within a PSNP or CNSP, with the understanding that lowering the credit for a particular adjacency will not stop the arrival of link state messages already in flight from that sending-router. This sub-field may be ignored by the data-sending router when transmitting link state messages to multi-access media, such as Ethernet.

MINPACKETINTERVAL sub-field 48 specifies the minimum interval, in microseconds, that the data-sending router of the adjacency must maintain between successive data-carrying packets. As described above, for point-to-point adjacencies, the data-sending router that receives TLV 40 must space data-carrying link state message by at least this interval when transmitting the messages the data-receiving router that originated the TLV. For multi-access media, the data-sending router maintains the longest interval specified by any of the routers participating in the multi-access L2 network. Incorporation of TLV into PSNPs or CSNPs used to acknowledge receipt of data-carrying link state PDUs, allows the data-receiving routers to control the data-sending router's policer, and thus the packet burst rate, with very low reverse bandwidth. This value can be changed at any time, and once again the data-receiving router that sends TLV 40 should tolerate latency in the data-sending router's response to the updated interval. A value of zero means that the data-receiving router requires no policer by the data-sending router. Certain values, e.g., 0xFFFFFFF0, may be reserved for special meaning IS-IS allows the inclusion of TLVs in any kind of IS-IS message and the protocol specification requires that unrecognized TLVs are to be ignored by the routers. In this manner, TLV 40 is referred to herein as an opaque TLV and the techniques described herein allow for the gradual introduction of this pull model, including burst rate control and average rate control, into existing IS-IS networks.

Figure 3:
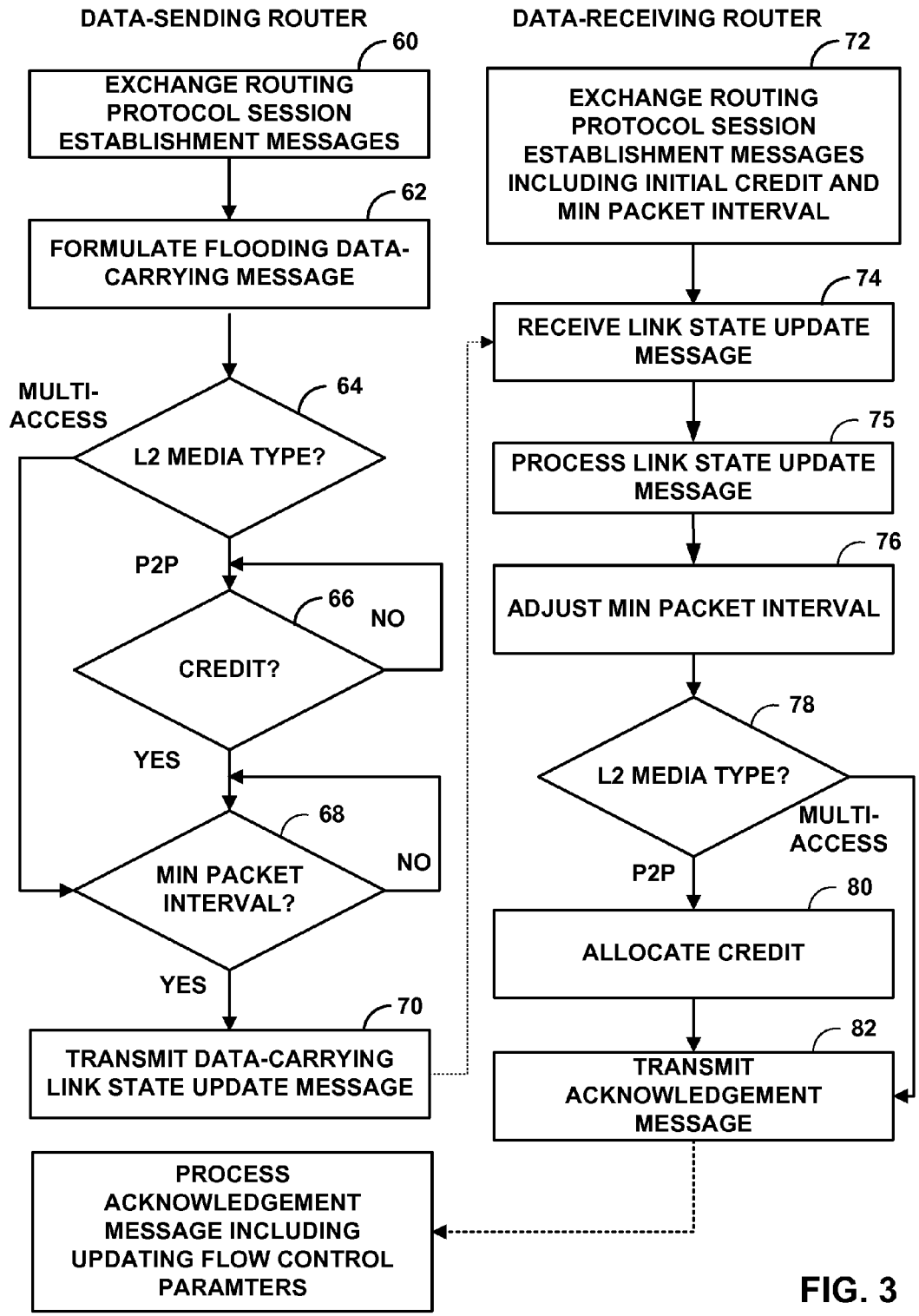
FIG. 3 is a flowchart illustrating example operation of a receiving router specifying a current transmission credit and a current policer value in accordance with an enhanced routing protocol.

FIG. 3 is a flowchart illustrating example operation of a data-sending router and a data-receiving router that utilize and enhanced flooding-based routing protocol in accordance with the principles described herein.

Initially, a pair of routers exchanges session establishment messages to establish an adjacency for the flooding-based routing protocol (60, 72). For example, the routers may exchange IS-IS HELLO PDUs to create the adjacency. Both the routers may include TLV 40 within it's transmitted IS-IS HELLO PDUs so as to specify initial the burst-rate and average-rate flow control parameters for use by the other routers when sending it data-carrying routing protocol packets. Each router may update an internal database, session table or other data structure to store the burst-rate and average-rate flow control parameters specified by the other router for the particular routing protocol adjacency. The syntax can be the same for both multicast mode and point-to-point mode. For example, TLV 40 may be carried in IS-IS HELLO PDUs for adjacency establishment, or an equivalent construct may be carried by an OSPF HELLO message to negotiate and establish initial credit and burst rate.

If the average-rate and burst-rate control information is not included in session establishment messages by at least one of the routers of the adjacency, it means that the router either has not implemented the flow control scheme or has been configured not to participate in the scheme. In this case, both routers fall back to the existing transmission methods of the flooding-based routing protocol.

The average-rate and burst-rate control information in session establishment messages serves to establish the initial credit and packet interval, which means that, for example by sending a credit of zero and/or a large inter-packet interval, a router could request a soft startup from its neighbors. The TLV within the HELLO messages is interpreted only at initial establishment of the adjacency and may be ignored by the receiving router once the adjacency is established without changing any current settings for the adjacency as specified within acknowledgement messages from the routers. This allows the same Hello packet to be sent indefinitely, which may be useful for distributed packet transmission/absorption mechanisms.

After establishing a flooding-based routing protocol adjacency, the routers periodically synchronize their link-state databases using flooded link state messages. That is, a data-sending router periodically formulates, and enqueues for transmission, one or more link state messages, such as IS-IS link state PDUs, for refreshing link state information to the other router (62). In this context, the router preparing to transmit link state message(s) is referred to as the data-sending router and the other router of the adjacency to which the link state messages will be sent is referred to as the data-receiving router.

With respect to outbound link state messages queued for transmission, the data-sending router may operate in one of two modes based on whether the routers are coupled by a multi-access L2 communication medium (e.g., Ethernet) or a point-to-point communication medium (e.g., optical links) (64).

In the event the adjacency is formed over a point-to-point link, the data-sending router queries the current average-rate flow control to determine whether a current transmission credit has been received for the adjacency to transmit a queued link state message (66). If not, the data-sending router waits for credit to be received (No of 66). If sufficient credit exists for the particular adjacency, the data sending router determines whether the specified minimum packet interval has elapsed since a prior data-carrying link state message has been flooded to the adjacency (68). If not, the data-sending router waits for sufficient time to elapse before proceeding (No of 68). If so, the data-sending router dequeues the link state message, floods the message to the adjacency and resets the packet interval timer (70).

In the event the adjacency is formed over a multi-access communication medium, the data-sending router ignores any average-rate flow control (i.e., credit) specified for the adjacency. Instead, the data sending router only determines whether the specified minimum packet interval has elapsed since a prior data-carrying link state message has been flooded to the adjacency (68). Upon waiting the specified time interval, the data-sending router dequeues the link state message and floods the message to the adjacency (70).

Upon receiving a data-carrying link-state message (74), the data-receiving router processes the message in accordance the link state protocol to update its link-state database (75). In addition, the data-receiving router may adjust its current average-rate control, i.e., minimum packet interval, for the particular adjacency based on its current ability to process incoming packets (76). If the packet was received for an adjacency over point-to-point communication media (78), the data-receiving router also allocates a credit for the adjacency, thereby controlling the burst-rate rate for the maximum number of packets that can be sent before additional credit is required (80). The data-receiving router may increase or decrease the minimum packet interval and/or allocated credit for the adjacency based on current packet-processing demands placed on the router. These demands may arise from the level of signaling control-plane packets to be processed by the data-receiving router, which may be represented by current queue lengths for inbound signaling packet queues associated with this and other routing-protocol adjacencies. In addition, the data-receiving router may adjust the minimum packet interval and/or allocate credit for the adjacency based on bandwidth and resources currently being consumed with forwarding transient data-plane traffic. Other criteria that may be considered includes the number of adjacencies currently being maintained by the router for the flooding-based routing protocol.

Upon making any adjustments and/or allocating credit for the adjacency, the data-receiving router outputs a link state acknowledgement message that acknowledges receive of the link state update message flooded to the adjacency (82). For example, the data-receiving router may output a partial sequence number PDU or a complete sequence number PDU to acknowledge receipt of the information. At this time, the data-receiving router includes LTV 40 within the link state acknowledgement message to convey to the data-sending router the current minimum packet interval and any credit allocated to the adjacency. In this manner, the techniques allow the flooding-based routing protocol communication mechanism to operate more as a pull-based model in which the data-receiving router has fine-grain control over the rate at which it receives data over the routing adjacency.

Figure 4:
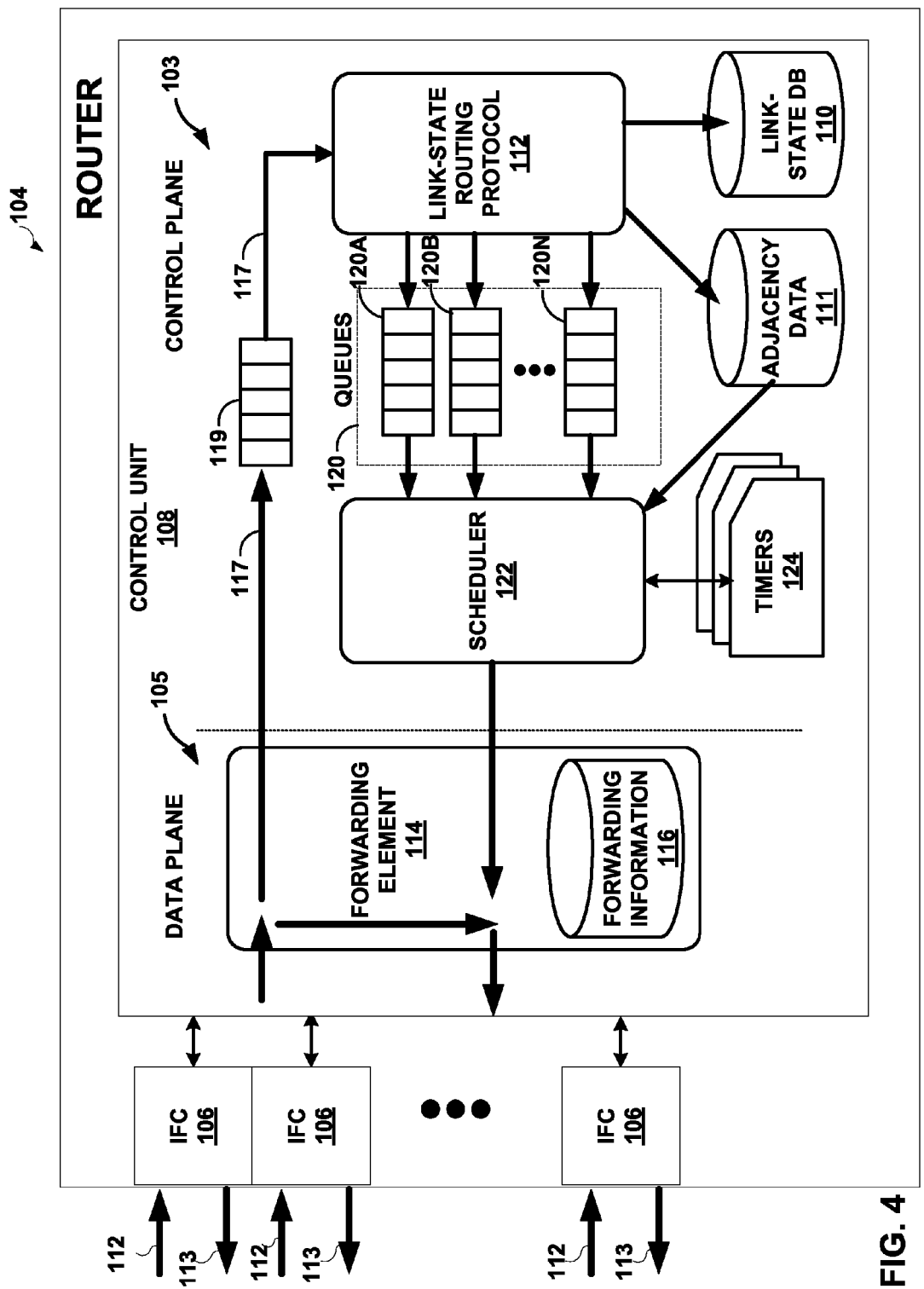
FIG. 4 is a flowchart illustrating example operation of a sending router transmitting packets in accordance with an enhanced routing protocol.

FIG. 4 is a block diagram illustrating an example router 104 configured consistent with the principles of the invention. Router 104 may, for example, represent any of routers 14 of FIG. 1. In the exemplary embodiment illustrated in FIG. 4, router 104 includes one or more interface cards (IFCs) 106 for sending and receiving packets using network links 112 and 113. IFCs 106 are typically coupled to network links 112, 113 via a number of physical interface ports. In general, router 104 receives inbound packets from network links 112, determines destinations for the received packets, and outputs the packets on network links 113 based on the destinations. In this way, network links 112, 113 provide L2 communications media for transmitting packets. Any of network links 112, 113 may be multi-access media, such as an Ethernet network, or point-to-point media such as optical connections.

In general, router 104 may be thought of as having a control unit 108 that provides a control plane 103 and a data plane 105. Control plane 103 is primarily responsible for maintaining a link-state database (DB) 110 to reflect the current link state data of flooding domain. For example, routing engine 68 provides an operating environment for execution of link-state routing protocol 112 that communicate with peer routers and periodically update link state DB 110 to accurately reflect the link state of the flooding domain (e.g., flooding domain 10 of FIG. 1) within which router 104 operates. Example protocols include routing and label switching protocols, such as IS-IS and OSPF.

In accordance with link state DB 110, forwarding element 114 maintains forwarding information 116 that associates network destinations or other keying information with specific next hops and corresponding interface ports of output interface cards 106 of router 108. Control plane 103 typically processes link state DB 110 to perform route selection and generate forwarding information 116 based on selected routes. In this way, forwarding information may be programmed into data plane 105. Control plane 103 may generate forwarding information 116 in the form of a table, list, radix tree or other data structure. U.S. Pat. No. 7,184,437 provides details on an exemplary embodiment of a router that utilizes a radix tree for route resolution, the contents of which is incorporated herein by reference in its entirety.

When forwarding a transient packet, forwarding element 114 traverses forwarding information 116 based on keying information within a header of the packet to ultimately select a next hop and output interface to which to forward the packet. Based on the selection, forwarding element 114 may output the packet directly to the output interface or, in the case of a multi-stage switch fabric of a high-end router, may forward the packet to subsequent stages for switching to the proper output interface. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference. The invention is not limited to this architecture. In other embodiments, router 104 may be configured in a variety of ways. In one embodiment, for example, all or portions of control plane 103 and data plane 105 may be replicated and incorporated directly within IFCs 106.

As described herein, link state routing protocol 112 is a flooding-based communications protocol that has been extended in the manner described herein. Control plane 103 includes output queues 120 for storing link state messages for respective routing adjacencies maintained by link state routing protocol 112. For example, output queue 120A may store outbound link state messages for a first adjacency while output queue 120B may store outbound link state messages for a first adjacency. When dequeuing output link state messages for transmission via forwarding element 114, scheduler 122 operates in accordance with the techniques described herein and set forth above with respect to the flowchart of FIG. 3. That is, with respect to data-carrying link state messages, schedule 122 controls transmission of the link state messages in accordance with the based on the burst-rate flow control (i.e., minimum packet interval) and, in the event the adjacency is reachable via a point-to-point communications medium, the average-rate flow control (i.e., credit) specified for the adjacency.

Forwarding element 114 of data plane 105 communicates inbound link state messages 117 to inbound queue 119 for delivery to link state routing protocol 112. Link state routing protocol 112 processes the inbound link state messages and updates adjacency data 111 to maintain an entry for each adjacency established with another router. For example, each entry within adjacency data 111 specifies an identifier for the adjacency (e.g., IP address), the current credit allocated for the adjacency by the other router, the minimum packet interval for the adjacency as set by the other router, and the type of L2 communication medium by which the adjacency is reachable, i.e., point-to-point or multi-access. Link state routing protocol 112 updates the burst-rate and average-rate flow control data for a given adjacency upon receiving an inbound links state message (e.g., an IS-IS HELLO, PSNP or CSNP) for that adjacency that carries TLV 40 described above. In this case, link state routing protocol 112 parses the credit allocation and the current minimum packet interval set by the TLV and updates adjacency data 111, thereby adjusting the rate at which scheduler 112 transmits output link state messages for that adjacency.

Adjacencies reachable by the same L2 communications medium, i.e., a multi-access medium, may be marked within adjacency data 111 so as to group the adjacencies records. When dequeing any output link state messages for the group, schedule 122 controls the transmission based the longest minimum time interval specified by any of the adjacencies without regard to any current transmission credit for the adjacencies. Scheduler 122 maintains a timer 124 for each adjacency, or group of adjacencies in the case of multi-access media, and only outputs a link state message for a given adjacency when the minimum packet interval for that adjacency has been satisfied.

In another example, the techniques may provide an enhanced link state protocol for implemented within the framework of the Open Shortest Path First (OSPF) link state protocol to create a new type of network link state message that allows a router to specify a current transmission credit and a current policer value. In one example, the equivalent of TLV 40 may be included within OSFP HELLO messages or LSA acknowledgement packets. In another example, a new type of OSPF LSA may be defined to carry the burst-rate and average-rate flow control information described herein.

Figure 5:
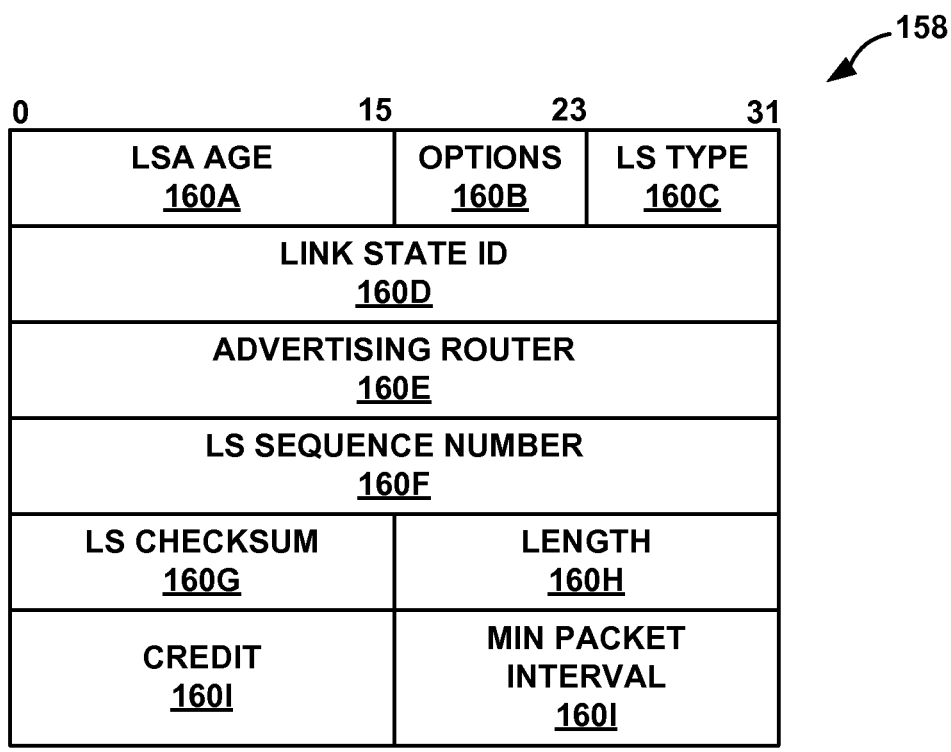
FIG. 5 is an example of a multiple broadcast link state message header that has been extended to allow a router to specify a current transmission credit and a current policer value.

FIG. 5 is an example of a link state message header 158 for carrying the burst-rate and average-rate flow control information described herein. Link state message header 200, as shown in the exemplary embodiment of FIG. 5, complies with the OSPF protocol in that it adheres to the four byte width limitation specified by the OSPF protocol. That is, link state message header 58 comprises a set of four-byte rows, as reflected in FIG. 5 by the 0-31 bit range for each row shown at the top of header 58. Further details of the format of OSPF link state messages can be found in RFC 2328, Internet Engineering Task Force (IETF), April, 1998 herein incorporated by reference.

As shown in FIG. 5, link state message header 158 comprises an link state message age field 60A, options field 60B, LS type field 60C, link state identifier field 60D ("link state ID 60D"), advertising router field 60E, link state sequence number field 60F, link state checksum field 60G, length field 60H, an allocated credit field 60I and a minimum packet interval field 160I. Although shown as contain fields 60A-60I ("fields 60"), link state message header 58 may contain more or less fields 60 shown in FIG. 5 so long as link state message header 58 comprises minimum packet interval field 160I and, optionally, credit field 60I.

LS age field 60A typically specifies the age of the link state message bearing link state message header 158 in seconds and is used to distinguish between two link state messages specifying the same link state message sequence number in their respective LS sequence number field 60F. Options field 60B may specify which optional capabilities are associated with the link state message bearing link state message header 58.

LS type field 60C indicates the format and function of the link state message bearing link state message header 58, i.e., the type of link state message. If LS type field 60C stores a "1,"for example, the link state message associated with link state message header 58 is designated as a router link state message. Alternatively, if LS type field 60C stores a "2," the link state message defined by link state message header 58 is determined to be a network link state message. LS type field 60C is used herein to indicate that the link state message is a flow-control type used to convey burst-rate and average-rate control information by specifying a different identifier not currently used to define an existing link state message type.

Link state ID field 60D typically identifies a portion of the routing domain that is being described by the link state message bearing link state message header 58. Advertising router field 60E may specify the OSPF router identifiers of the link state message's originator. LS sequence number field 60F may comprise a signed 32-bit integer used to detect old and duplicate link state messages. LS checksum field 60G may indicate whether the link state message accompanying link state message header 58 contains errors, and OSPF modules 44 may employ LS checksum field 60G to discard possibly faulty link state messages. Length field 60H indicates the length of link state message 158.

Credit field 60I is a newly defined field that may only appear in a link state message bearing the flow control type in LS type field 60C. In the event such a value is designated in field 60C, an OSFP routing protocol supporting the techniques described herein may receive and process the link state message to extract and record the current credit allocation and the minimum packet interval specified by the router that originated the link state message. The receiving router may subsequently use these values to control the rate at which link state messages are flooded to the router. As link state message header 158 defines a new type of OSPF message, routers within an OSPF network may select a period for outputting the OSPF messages carrying the information so as to control flooding of data-carrying OSPF LSAs without consuming significant network bandwidth. In addition, or alternatively, the newly defined type of OSPF message may include topology update information so as to supplant or replace conventional data-carrying LSAs and also convey the rate control information for transmissions in the reverse direction.

Although the techniques have been described with respect to providing burst-rate and average-rate flow control to flooding-based routing protocols to synchronize data between routers, the techniques may be applied to control information flow between distributed components of a single device or system. For example, it is contemplated that a router (e.g., a multi-chassis router) or other complex network device may internally utilize a flooding-based routing protocol to disseminate link state and other state information between distributed components. In this case, the techniques described herein allow distributed components (e.g., multiple routing and forwarding components) to implement flooding-based protocols to flood and synchronize state information within the device, yet allow the data-receiving components of the device to individually provide flow control over the flooding of the state information to the respective component. The devices may be separate physical components such that the flooding-based protocols sent communications over an internal switch fabric, bus or link. Alternatively, the different components may be different virtual machines (e.g., separate virtual routers) operating in a virtual environment provided by a common physical computing environment. In this case, the components may implement the flooding-based scheme by way of inter-process signaling mechanisms. Examples of network devices that internally communicate state information between distributed components are found in U.S. Pat. No. 7,739,403, entitled "SYNCHRONIZING STATE INFORMATION BETWEEN CONTROL UNITS," and U.S. patent application Ser. No. 11/292,204, entitled "NON-STOP FORWARDING IN A MULTI-CHASSIS ROUTER." each of which is hereby incorporated by reference.

Various embodiments of the invention have been described. These and other embodiments are within the scope of the following claims.

The invention claimed is:

1. A method of controlling transmission of link state messages of a flooding-based link-state routing protocol, the method comprising:
   establishing a link-state routing adjacency between a first router and a second router over a layer-two (L2) communication medium;
   sending one or more link state messages from the first router to the second router to synchronize link-state databases of the first router and the second router;
   receiving, with the first router, an inbound acknowledgement message from the second router that acknowledges receipt of the previously sent one or more link state messages in accordance with the flooding-based link state routing protocol, wherein the inbound acknowledgement message specifies a minimum packet interval for the first router to maintain between subsequent link state messages flooded to the second router; and flooding a plurality of link state messages from the first router to the second router over the L2 communication medium to communicate the link state messages, wherein the first router maintains at least the specified minimum packet interval between each of the plurality of link state messages when flooding the plurality of link state messages to the L2 communication medium.

2. The method of claim 1, further comprising:

determining, with the first router, whether the L2 communication medium comprises a multi-access communication medium or a point-to-point communication medium, when the L2 communication medium comprises a point-to-point communication medium, operating the first router in a first mode in which the first router outputs the plurality of link state messages with the first router to the L2 communication medium with a time interval between successive packets that exceeds the minimum packet interval for the adjacency; and when the L2 communication medium comprises a multi-access communication medium, operating the first router in a second mode in which the first router: (a) identifies a longest minimum packet interval specified by any router within a group of routers having adjacencies with the first router and reachable through the same L2 communication medium, and (b) floods the plurality of link state messages with the first router to the L2 communication medium with a time interval between successive packets that exceeds the identified minimum packet interval for the group of routers.

3. The method of claim 1, wherein the inbound acknowledgement message further specifies a packet credit allocated to the adjacency by the second router, and wherein flooding a plurality of link state messages from the first router to the second router over the L2 communication medium comprises flooding a subset of the plurality of link state messages with the first router up to the allocated packet credit and waiting until additional credit is received from the second router before flooding a remaining portion of the plurality of link state messages.

4. The method of claim 3, wherein the packet credit specifies one of a number of packets or a number of bytes allocated for the routing-protocol adjacency.

5. The method of claim 3, wherein the inbound acknowledgement message includes a Type, Length, and Value (TLV) that includes a first sub-field to specify the minimum packet interval for the adjacency and a second sub-field to specify the packet credit allocated to the adjacency by the second router.

6. The method of claim 5, wherein the inbound acknowledgement message comprises an Intermediate System to Intermediate System (IS-IS) Partial Sequence Number Protocol data units (PDUs) (PSNPs) that acknowledges receipt of the previously sent link state messages and contains the TLV that specifies the minimum packet interval and the packet credit.

7. The method of claim 1, wherein the inbound acknowledgement message further specifies a packet credit allocated to the adjacency by the second router, the method further comprising:

determining, with the first router, whether the L2 communication medium comprises a multi-access communication medium or a point-to-point communication medium;

when the L2 communication medium comprises a point-to-point communication medium, controlling the flooding of the plurality of link state messages from the first router to the second router in accordance with the allocated packet credit by outputting a subset of the plurality of link state messages with the first router up to the allocated packet credit and waiting until additional credit is received from the second router before outputting a remaining portion of the plurality of link state messages; and when the L2 communication medium comprises a multi-access communication medium, flooding the plurality of link state messages from the first router to the second router over the L2 communication medium without regard to the packet credit specified for the adjacency by the inbound acknowledgement message.

8. A routing device comprising:

a network interface configured to send and receive packets over a layer-two (L2) communication medium;

a control unit coupled to the network interface;

a flooding-based link state routing protocol executing on a processor of the control unit to maintain network topology information for a network, wherein the link-state routing protocol establishes an adjacency with a peer router over the layer-two (L2) communication medium;

a database that stores a minimum packet specified by the peer router for the adjacency;

an outbound packet queue to store a plurality of link state messages generated by the link state routing protocol to be flooded to the peer router over the L2 communication medium; and a scheduler that dequeues the link state messages from the outbound packet queue and floods each of the link state messages to the L2 communication medium, wherein the scheduler maintains at least the specified minimum packet interval between each of the plurality of link state messages when flooding the plurality of link state messages to the L2 communication medium, wherein the link state routing protocol is configured to receive an inbound acknowledgement message from the peer router that acknowledges receipt of link state messages previously sent from the routing device to the peer router, wherein the inbound acknowledgement message specifies the minimum packet interval for the routing device to maintain between subsequent link state messages flooded to the peer router over the L2 communication medium.

9. The routing device of claim 8, wherein the database includes records for a plurality of routers with which the routing device maintains link-state routing protocol adjacencies over the L2 communication medium, each of the records specifying a minimum packet interval specified by the respective router for flooding link state messages to the router, wherein, when the L2 communication medium comprises a point-to-point communication medium, the scheduler operates in a first mode in which the scheduler floods the plurality of link state messages to the L2 communication medium with a time interval between successive link state messages that exceeds the minimum packet interval specified by the peer router, and wherein, when the L2 communication medium comprises a multi-access communication medium, the scheduler operates in a second mode in which the scheduler: (a) accesses the database to identify a longest minimum packet interval specified by any of the plurality of routers having the adjacencies over the L2 communication medium, and (b) floods the plurality of link state messages to the L2 communication medium with a time interval between successive link state messages that exceeds the identified minimum packet interval for the plurality of routers.

10. The routing device of claim 8,
wherein the database stores data specifying a packet credit currently allocated to the adjacency by the peer router, and
wherein the scheduler floods the plurality of link state messages a subset of the plurality of link state messages with the first router up to the allocated packet credit and waits until additional credit is received from the peer router before flooding a remaining portion of the plurality of link state messages.

11. The routing device of claim 10,
wherein the link state routing protocol receives the inbound acknowledgement message from the peer router having a Type, Length, and Value (TLV) that includes a first sub-field to specify the minimum packet interval for the adjacency and a second sub-field to specify the packet credit allocated to the adjacency by the peer router, and
wherein the link state routing protocol updates the database based on the minimum packet interval and the packet credit specified within the TLV.

12. The routing device of claim 11, wherein the inbound acknowledgement message comprises an Intermediate System to Intermediate System (IS-IS) Partial Sequence Number Protocol data units (PDUs) (PSNPs) that acknowledges receipt of previously sent link state messages and contains the TLV that specifies the minimum packet interval and the packet credit.

13. The routing device of claim 10, wherein the packet credit specifies one of a number of packets or a number of bytes allocated for the routing-protocol adjacency.

14. The routing device of claim 8,
wherein the database includes records for a plurality of routers with which the routing device maintains link-state routing protocol adjacencies over the L2 communication medium, each of the records specifying a minimum packet interval and a packet credit specified by the respective router for flooding link state messages to the router,
when the L2 communication medium comprises a point-to-point communication medium, the scheduler operates in a first mode in which the scheduler floods a subset of the plurality of link state messages to the L2 communication medium up to the allocated packet credit and waiting until additional credit is received from the peer router before flooding a remaining portion of the plurality of link state messages; and
when the L2 communication medium comprises a multi-access communication medium, the scheduler operates in a second mode in which the scheduler floods the plurality of link state messages from the first router to the peer router over the L2 communication medium without regard to the packet credit specified for the adjacency by the inbound link state message.

15. A routing device comprising:
a network interfaces configured to send and receive packets over a layer-two (L2) communication medium;
a control unit coupled to the network interface;
a flooding-based link state routing protocol executing on a processor of the control unit to maintain network topology information for a network, wherein the link-state routing protocol establishes an adjacency with a peer router over the layer-two (L2) communication medium; and
an inbound packet queue to store a set of one or more link state messages flooded to the routing device from the peer router over the L2 communication medium,
wherein the link state routing protocol generates and outputs an acknowledgement message in response to receiving the set of link state messages, wherein the link state routing protocol generates the acknowledgement message to specify a minimum packet interval for the peer router to maintain between subsequent link state messages flooded to the routing device over the L2 communication medium.

16. The routing device of claim 15, wherein the wherein the link state routing protocol generates the acknowledgement message to include a Type, Length, and Value (TLV) that includes a first sub-field to specify the minimum packet interval for the adjacency and a second sub-field to specify a packet credit allocated to the adjacency.

* * * * *